(12) United States Patent
Kobayashi

(10) Patent No.: US 11,477,421 B2
(45) Date of Patent: Oct. 18, 2022

(54) DISPLAY CONTROL DEVICE, IMAGE CORRECTION METHOD, AND RECORDING MEDIUM RECORDED WITH PROGRAM

(71) Applicant: TOYOTA JIDOSHA KABUSHIKI KAISHA, Toyota (JP)

(72) Inventor: Yoshimi Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/193,085

(22) Filed: Mar. 5, 2021

(65) Prior Publication Data

US 2021/0306603 A1 Sep. 30, 2021

(30) Foreign Application Priority Data

Mar. 25, 2020 (JP) .............................. JP2020-055167

(51) Int. Cl.
*H04N 9/31* (2006.01)
*G06F 21/32* (2013.01)
*B60K 37/02* (2006.01)
*G06F 21/84* (2013.01)

(52) U.S. Cl.
CPC ........... *H04N 9/3185* (2013.01); *B60K 37/02* (2013.01); *G06F 21/32* (2013.01); *G06F 21/84* (2013.01); *B60K 2370/152* (2019.05)

(58) Field of Classification Search
CPC .......... H04N 9/31; H04N 9/3185; H04N 7/18; B60K 37/02; B60K 2370/152; G06F 21/32; G06F 21/84

USPC ................................................... 348/744, 148
See application file for complete search history.

(56) References Cited

U.S. PATENT DOCUMENTS

| 6,056,408 | A | 5/2000 | Kobayashi | |
|---|---|---|---|---|
| 9,544,146 | B2* | 1/2017 | Su | ............ H04L 9/3231 |
| 2019/0235624 | A1* | 8/2019 | Goldberg | ............ G02B 27/0179 |
| 2020/0233216 | A1* | 7/2020 | Liesener | ................ B60K 37/06 |
| 2020/0290458 | A1* | 9/2020 | Sunaga | ............... G02B 27/0093 |
| 2021/0019867 | A1* | 1/2021 | Hayashi | ............. G02B 27/0101 |

FOREIGN PATENT DOCUMENTS

| JP | 10-333088 A | 12/1998 |
|---|---|---|
| JP | 2013-218346 A | 10/2013 |
| JP | 2018-79838 A | 5/2018 |
| JP | 2018-184114 A | 11/2018 |

* cited by examiner

*Primary Examiner* — Trang U Tran
(74) *Attorney, Agent, or Firm* — Oblon, McClelland, Maier & Neustadt, L.L.P.

(57) ABSTRACT

A display control device includes a processor. The processor being configured to: output an image to a projection unit for projecting an image onto an interior surface of a vehicle; acquire vision information of an occupant of the vehicle; detect misalignment between a target image projected onto the interior surface and a design-reference state of the target image based on vision information acquired while the occupant fixates on the target image projected onto the interior surface; and correct an image projected by the projection unit based on the misalignment.

12 Claims, 9 Drawing Sheets

DISPLAY CONTROL DEVICE, IMAGE CORRECTION METHOD, AND RECORDING MEDIUM RECORDED WITH PROGRAM

CROSS-REFERENCE TO RELATED APPLICATION

This application is based on and claims priority under 35 USC 119 from Japanese Patent Application No. 2020-055167 filed on Mar. 25, 2020, the disclosure of which is incorporated by reference herein.

BACKGROUND

Technical Field

The present disclosure relates to a display control device for controlling an image projected onto an interior surface, an image correction method, and a recording medium recorded with a program.

Related Art

Japanese Patent Application Laid-Open (JP-A) No. 2018-079838 discloses a rearward projection device serving as a display device that projects an image from a projector inside an instrument panel of a vehicle onto a curved surface of the instrument panel.

However, there is room for improvement in the display device described in JP-A No. 2018-079838 from the perspective of correcting distortion of the projected image as a result of variation in the profile of the instrument panel and variation during projector assembly.

SUMMARY

An object of the present disclosure is to provide a display control device, an image correction method and a program capable of reducing the time required to correct distortion of an image projected onto an interior surface.

A display control device of a first aspect includes an output section configured to output an image to a projection unit for projecting an image onto an interior surface of a vehicle, an acquisition section configured to acquire vision information of an occupant of the vehicle, a detection section configured to detect misalignment between a target image projected onto the interior surface and a design-reference state of the target image based on vision information acquired by the acquisition section while the occupant fixates on the target image projected onto the interior surface, and a correction section configured to correct an image projected by the projection unit based on the misalignment detected by the detection section.

The display control device of the first aspect is applied to the vehicle equipped with the projection unit that projects an image onto the interior surface. The display control device is formed such that the output section outputs an image to the projection unit, and the acquisition section is capable of acquiring the vision information of the occupant. When the occupant fixates on the target image projected onto the interior surface, the detection section detects misalignment between the target image projected onto the interior surface and the design-reference state based on the acquired vision information.

The correction section then corrects the image projected by the projection unit based on the detected misalignment. Note that the target image refers to an image applied with a dot or hollow circular marker, an image applied with a crosshair pattern configured from a combination of vertical and horizontal lines, or the like, and is an image enabling the occupant to fixate on a particular location. The design-reference state refers to a display state of the target image in a case in which the projection of the target image onto the interior surface is true to design. In this display control device, distortion of images projected onto the interior surface is corrected by the occupant fixating on the target image, thus reducing the time required for correction.

A display control device of a second aspect is the display control device of the first aspect, wherein the target image includes at least one feature point, the vision information is position information of a fixation point when the occupant fixates on one feature point on the interior surface, and the detection section is configured to detect the misalignment by comparing a design-reference position of the one feature point against a position of the one fixation point corresponding to the one feature point.

In the display control device of the second aspect, the vision information is position information of a fixation point of the occupant corresponding to the feature point on the interior surface, and the detection section detects the misalignment by comparing the design-reference position of the feature point against the position of the fixation point corresponding to the feature point. Note that the feature point is a point in the target image that the occupant is able to fixate on. This display control device enables the position of the feature point in the projected target image to be ascertained by acquiring the fixation point of the occupant, and thereby enables misalignment with respect to the design-reference position to be detected.

A display control device of a third aspect is the display control device of the second aspect, wherein the output section outputs the target image to the projection unit when the projection unit is being assembled to the vehicle, the target image including plural of feature points to be displayed at plural different positions on the interior surface.

The display control device of the third aspect enables misalignment of the display on the interior surface to be precisely detected by having the occupant fixate on the plural points on the target image when the projection unit is being assembled to the vehicle.

A display control device of a fourth aspect is the display control device of the third aspect, wherein the output section outputs the target image such that the plural feature points are sequentially displayed on the interior surface.

In cases in which plural feature point are displayed on the interior surface, there is a need on the device side to distinguish which feature point out of the plural feature points the occupant is fixating on. In contrast thereto, in the display control device of the fourth aspect, the feature points are sequentially displayed on the interior surface one at a time, thereby enabling distinguishing of which feature point is being fixated on to be simplified.

A display control device of a fifth aspect is the display control device of the third aspect or the fourth aspect, wherein the target image includes at least one of the feature points displayed inside a prescribed region of the interior surface, and feature points displayed at least at four locations at an outer edge of the prescribed region.

In the display control device of the fifth aspect, in the target image at least one of the feature points is provided at the inside and four of the feature points are provided at the outer periphery, thereby enabling tilting of the image projected onto the interior surface and distortion of the interior surface to be detected.

A display control device of a sixth aspect is the display control device of any one aspect of the second aspect to the fifth aspect, wherein a single one of the at least one feature points is included in the target image in a case in which the vehicle is being utilized by the occupant. Moreover, the display control device further includes the correction section configured to perform correction in a case in which the misalignment is within a permissible range within which correction is permitted, and a notification section configured to perform a prescribed notification in a case in which the misalignment exceeds the permissible range.

In the display control device of the sixth aspect, providing the single feature point in correction when the vehicle is being utilized enables misalignment of the image display position due to translational movement to be detected while suppressing inconvenience to the occupant who is being made to fixate on the image in order to correct the image. Moreover, this display control device is also capable performing external notification in cases in which the display position is greatly misaligned.

A display control device of a seventh aspect is the display control device of the sixth aspect, wherein as the feature point, the output section outputs to the projection unit a target employed to acquire iris information of the occupant by an authentication section for performing iris authentication, and while the iris authentication is being performed, the detection section detects the misalignment based on the iris information acquired by the authentication section when the occupant fixates on the target.

The display control device of the seventh aspect enables image correction to be performed while iris authentication is being performed.

A display control device of an eighth aspect is the display control device of the first aspect, wherein the vision information is viewpoint information regarding an observation point of an eye of the occupant, and the detection section detects the misalignment by comparing a design-reference shape of the target image against an apparent shape of the target image based on the viewpoint information and a profile of the interior surface.

In the display control device of the eighth aspect, the apparent shape of the target image being displayed to the occupant is identified based on information for an observation point of the eye of the occupant and on the profile of the interior surface. This display control device thus enables misalignment arising due to differences in display region and angle according to the position of the eye of the occupant to be detected by comparing the design-reference shape of the target image against the apparent shape of the target image.

A display control device of a ninth aspect is the display control device of any one aspect of the first aspect to the eighth aspect, wherein the correction section performs correction to reshape an image projected by the projection unit so as to eliminate the misalignment detected by the detection section, and the output section outputs the corrected image to the projection unit.

The display control device of the ninth aspect enables display correction to be performed without any additional hardware configuration.

An image correction method of a tenth aspect includes output processing to output an image to a projection unit for projecting an image onto an interior surface of a vehicle, acquisition processing to acquire vision information of an occupant of the vehicle, detection processing to detect misalignment between a target image projected onto the interior surface and a design-reference state of the target image based on the vision information acquired while the occupant fixates on the target image projected onto the interior surface, and correction processing to correct a projected image based on the detected misalignment.

The image correction method of the tenth aspect is applied to the vehicle equipped with the projection unit that projects an image onto the interior surface. In the image correction method the output processing outputs an image to the projection unit, and the acquisition processing acquires the vision information of the occupant. When the occupant fixates on the target image projected onto the interior surface, misalignment between the target image projected onto the interior surface and the design-reference state of the target image is detected in the detection processing based on the acquired vision information. The image projected is corrected in the correction processing based on the detected misalignment. Note that the target image and the design-reference state are as described above. In this image correction method, distortion of images projected onto the interior surface is corrected by the occupant fixating on the target image, thus reducing the time required for correction.

An eleventh aspect is a non-transitory recording medium recorded with a program. The program causes a computer to execute processing. The processing includes output processing to output an image to a projection unit for projecting an image onto an interior surface of a vehicle, acquisition processing to acquire vision information of an occupant of the vehicle, detection processing to detect misalignment between a target image projected onto the interior surface and a design-reference state of the target image based on the vision information acquired while the occupant fixates on the target image projected onto the interior surface, and correction processing to correct a projected image based on the detected misalignment.

The program recorded in the non-transitory recording medium of the eleventh aspect causes a computer to execute the following processing in a vehicle equipped with the projection unit that projects an image onto the interior surface. Namely, this program includes outputting an image to the projection unit by the output processing, and acquiring the vision information of the occupant by the acquisition processing. When the occupant fixates on the target image projected onto the interior surface, misalignment between the target image projected onto the interior surface and the design-reference state of the target image is detected in the detection processing based on the acquired vision information. The image projected is corrected in the correction processing based on the detected misalignment. Note that the target image and the design-reference state are as described above. In this program, distortion of images projected onto the interior surface is corrected by the occupant fixating on the target image, thus reducing the time required for correction.

The present disclosure is accordingly capable of reducing the time required to correct distortion of an image projected onto an interior surface.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
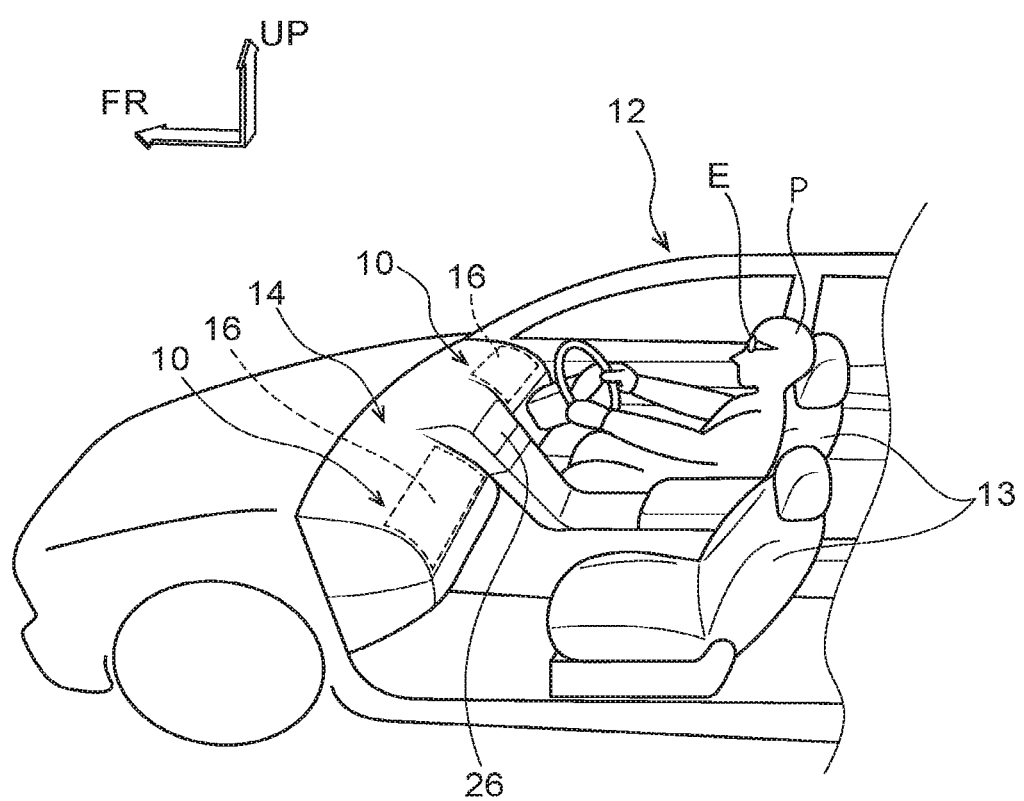
FIG. 1 is a diagram illustrating an external appearance of a display device according to a first exemplary embodiment.

Explanation follows regarding a vehicle 12 installed with a display device of a first exemplary embodiment. As illustrated in FIG. 1, in the vehicle 12 according to the present exemplary embodiment, a dashboard 14 disposed at a vehicle front side of front seats 13 on which occupants P can sit is provided with display devices 10. One of the display devices 10 is provided for each of the front seats 13. Each of the display devices 10 includes a projection surface 16, serving as a display section used to display images on the dashboard 14. The projection surface 16 is an example of an interior surface.

In the present exemplary embodiment, a projector 24 (see FIG. 2) installed behind the dashboard 14 projects an image onto the projection surface 16 from behind the dashboard 14. The occupant P is thereby able to view the image from a front side of the projection surface 16. A touch panel 26, serving as an input device, is provided between the left and right of the dashboard 14.

Figure 2:
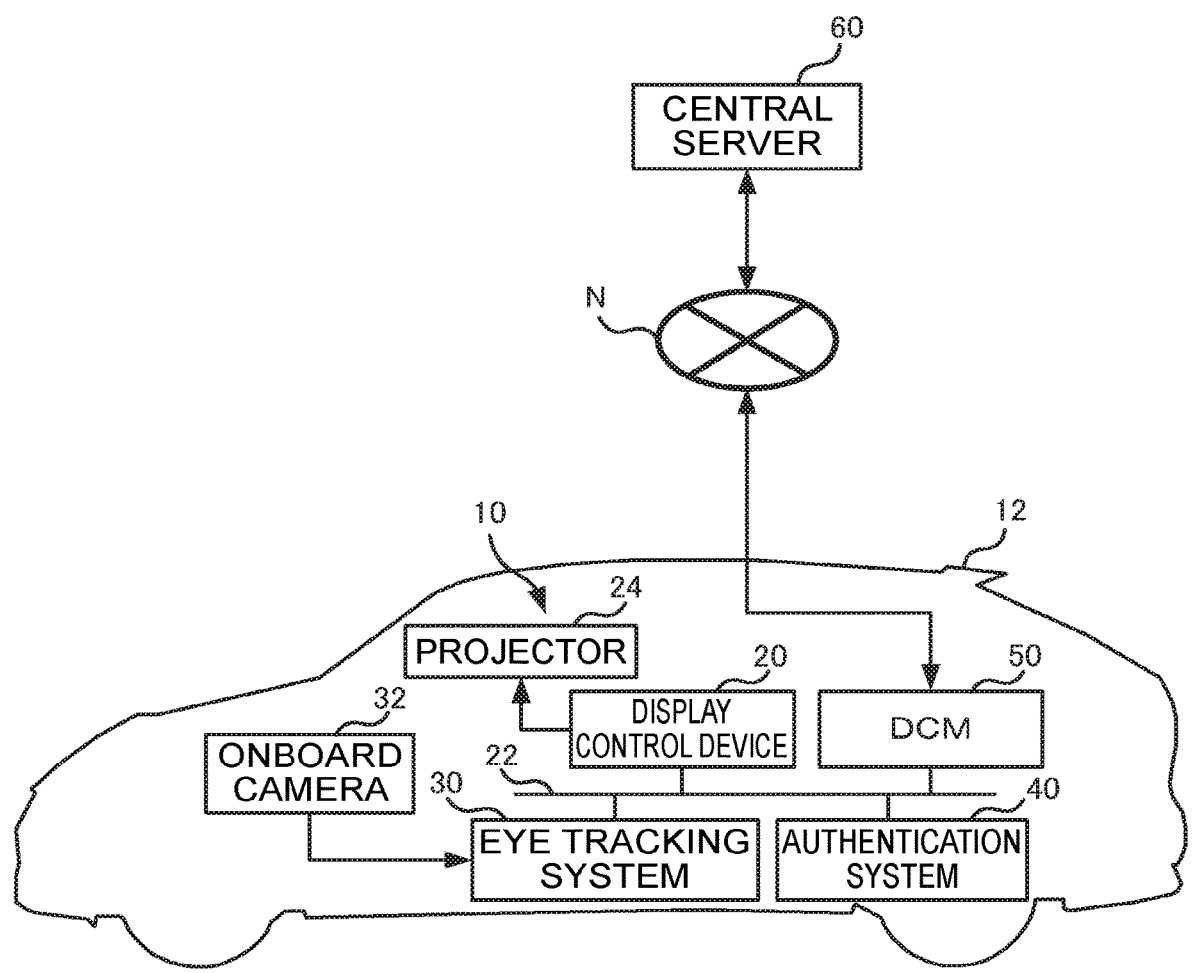
FIG. 2 is a diagram illustrating a schematic configuration of a central server and a vehicle of the first exemplary embodiment.

As illustrated in FIG. 2, the display device 10 is configured including the projector 24 serving as a projection unit that projects images onto the projection surface 16, and a display control device 20 that controls the images output to the projector 24.

In addition to the display device 10, the vehicle 12 according to the present exemplary embodiment is configured including an eye tracking system 30, an authentication system 40, and a data communication module (DCM) 50.

An onboard camera 32 that is installed inside the vehicle cabin in order to image the occupant P is electrically connected to the eye tracking system 30. The eye tracking system 30 is thereby capable of acquiring an image of the occupant P captured by the onboard camera 32. The eye tracking system 30 may be provided as a dedicated device, or may be provided as a device also employed by a drive recorder or augmented reality (AR) glasses.

The authentication system 40 serves as an authentication section that is capable of acquiring an iris scan of an eye E of the occupant P (see FIG. 1) and of performing iris authentication.

The DCM 50 serves as a communication system, and functions as a communication device for communicating with the vehicle 12 exterior. The DCM 50 of the present exemplary embodiment is connected to a central server 60 through a network N. The central server 60 is thereby capable of acquiring information from the vehicle 12, and also capable of providing information to the vehicle 12. The DCM 50 of the present exemplary embodiment is capable of communicating via 5G, LTE, or the like.

The display control device 20, the eye tracking system 30, the authentication system 40, and the DCM 50 are connected together through an external bus 22. A communication protocol employing a controller area network (CAN) is employed as the communication method of the external bus 22. Note that the communication method is not limited thereto, and a LAN protocol such as Ethernet (registered trademark) may be adopted instead.

Figure 3:
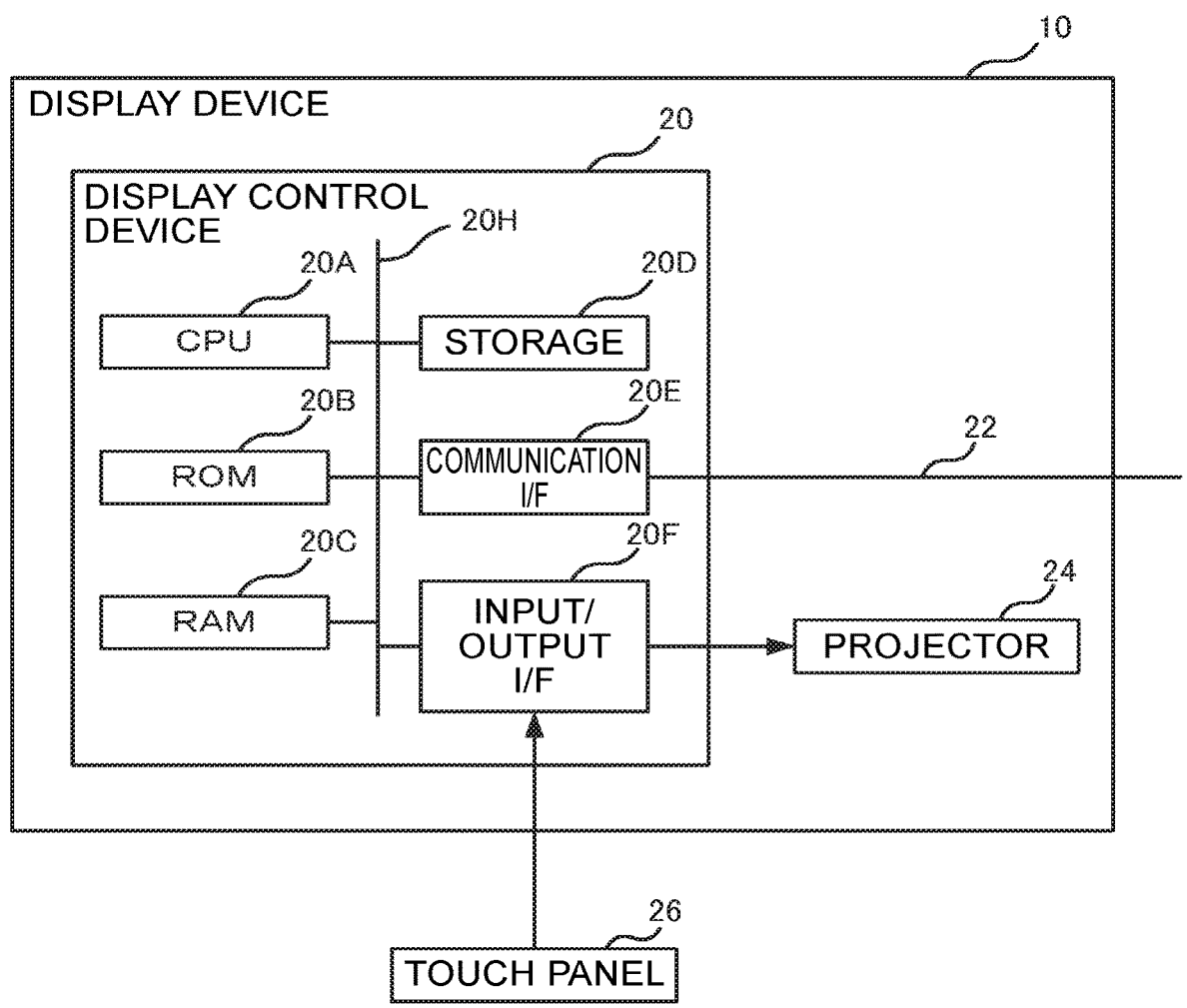
FIG. 3 is a block diagram illustrating a hardware configuration of a display device of the first exemplary embodiment.

FIG. 3 is a block diagram illustrating hardware configuration of the display device 10 installed in the vehicle 12 of the present exemplary embodiment.

The display control device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E, and the input/output I/F 20F are connected together so as to be capable of communicating with each other through an internal bus 20H.

The CPU 20A serves as a central processing unit that executes various programs and controls various sections. Namely, the CPU 20A reads a program from the ROM 20B or the storage 20D and executes the program in the RAM 20C, serving as a workspace. The CPU 20A is an example of a processor. In the present exemplary embodiment, a control program 100 is stored in the storage 20D (see FIG. 4). The CPU 20A executes the control program 100, thereby causing the display control device 20 to function as an output section 200, an acquisition section 210, a detection section 220, a correction section 230, and a notification section 240, as illustrated in FIG. 5.

As illustrated in FIG. 3, the ROM 20B stores various programs and various data. The RAM 20C acts as a workspace where programs and data are temporarily stored.

The storage 20D is configured by a hard disk drive (HDD) or a solid state drive (SSD), and stores various programs and various data.

The communication I/F 20E is an interface for communicating with the eye tracking system 30, the authentication system 40, and the DCM 50. The communication I/F 20E is connected to the external bus 22.

The input/output I/F 20F is an interface for communicating with various devices installed in the vehicle 12. In the display control device 20 of the present exemplary embodiment, the projector 24 and the touch panel 26 are connected through the input/output I/F 20F. Note that the projector 24 and the touch panel 26 may be directly connected through the internal bus 20H.

Figure 4:
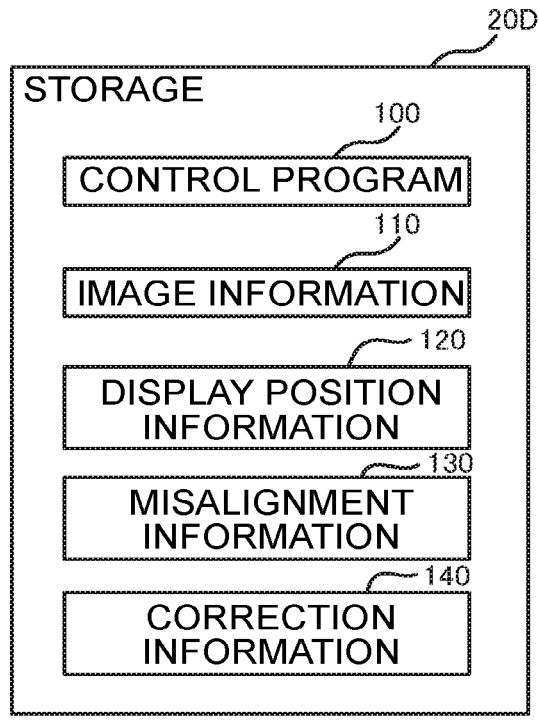
FIG. 4 is a block diagram illustrating an example of a configuration of storage of a display control device of the first exemplary embodiment.
Figure 5:
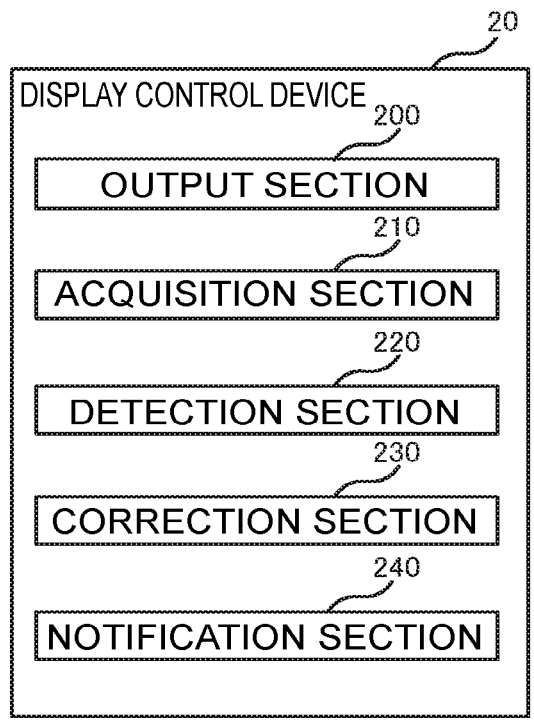
FIG. 5 is a block diagram illustrating an example of a functional configuration of a display control device of the first exemplary embodiment.

FIG. 4 is a block diagram illustrating configuration of the storage 20D. The control program 100, image information 110, display position information 120, misalignment information 130, and correction information 140 are stored in the storage 20D.

The control program 100 is a program for executing assembly processing and adjustment processing, described later.

Figure 6:
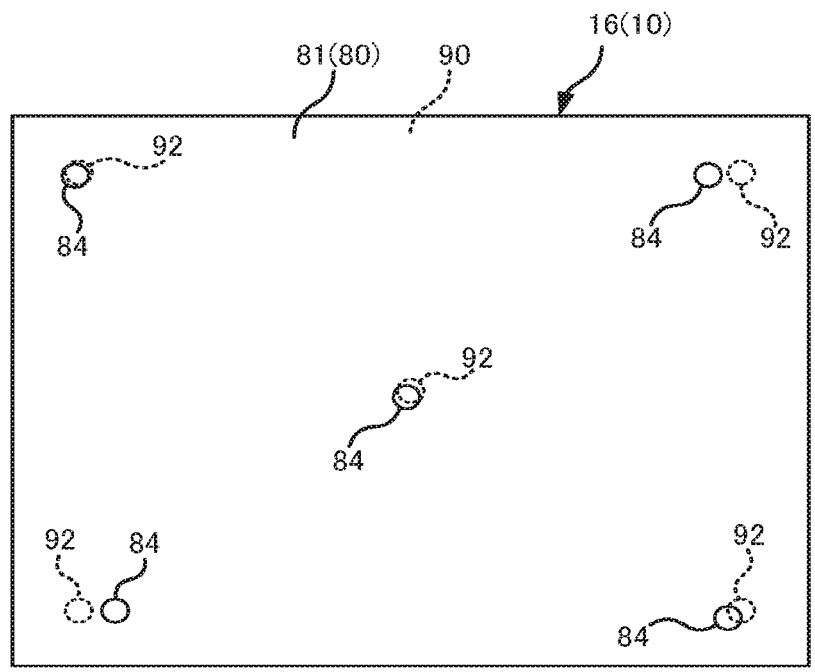
FIG. 6 is a diagram illustrating an example of a test image displayed on a projection surface in the first exemplary embodiment.
Figure 7:
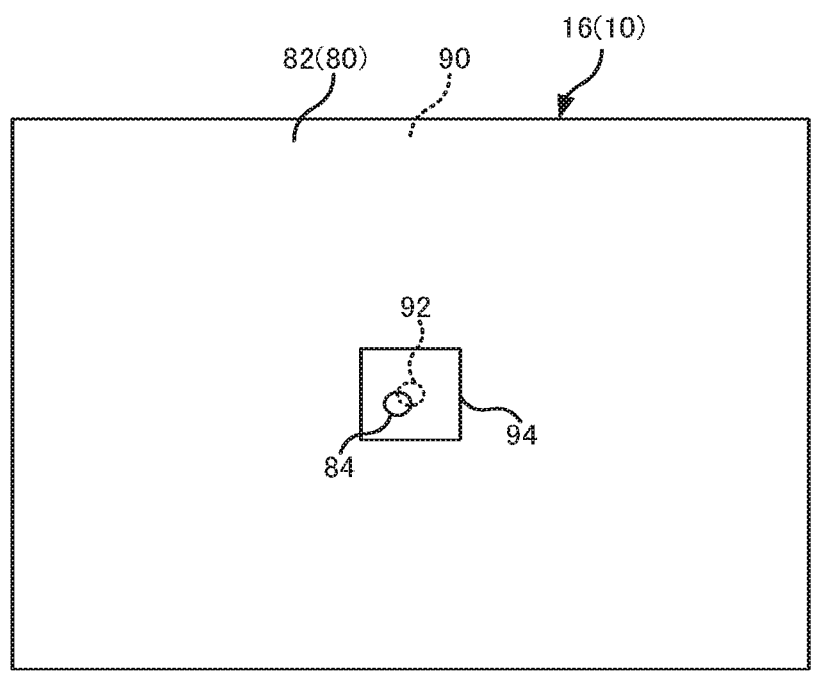
FIG. 7 is a diagram illustrating an example of an authentication image displayed on a projection surface in the first exemplary embodiment.

Target images 80, these being images to be displayed on the projector 24, are stored in the image information 110. The target images 80 include a test image 81 as illustrated in FIG. 6, and an authentication image 82 as illustrated in FIG. 7. The test image 81 is an image output during the assembly processing, described later. As illustrated in FIG. 6, the test image 81 includes plural markers 84, these being feature points displayed at plural different positions on the projection surface 16. Note that the feature points are points in the target image 80 for the occupant P to fixate on. Specifically, the markers 84 are provided at a total of five locations, these being at the vertical and horizontal center of the projection surface 16, and close to the respective corners of the rectangular projection surface 16. As illustrated in FIG. 7, the authentication image 82 is an image that is output during the adjustment processing, described later. The authentication image 82 includes a single marker 84 to guide the eyes E of the occupant P toward the onboard camera 32 in order for the authentication system 40 to acquire iris information of the occupant P for iris authentication. This marker 84 is provided at the vertical and horizontal center of the projection surface 16.

Design-reference three-dimensional coordinates of the respective markers 84 are also stored in the image information 110 as design information. In the present exemplary embodiment, in cases in which the display device 10 has been assembled to the vehicle 12 true to design, the coordinates of the respective markers 84 will be present on the projection surface 16.

Figure 8:
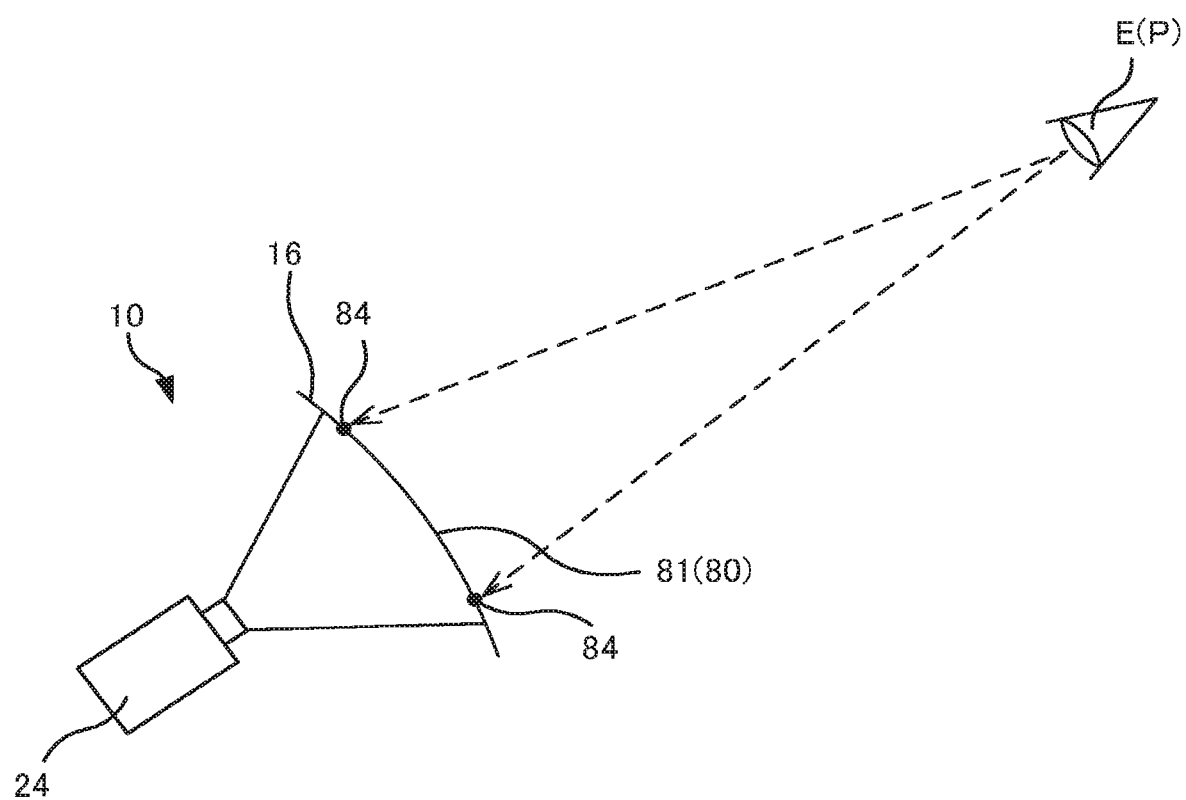
FIG. 8 is a diagram illustrating a positional relationship between a display device of the first exemplary embodiment and the eyes of an occupant.

Coordinates of fixation points of the occupant P, as measured by the eye tracking system 30, are stored in the display position information 120. As illustrated in FIG. 8, the fixation points correspond to locations where the occupant P fixates on the markers 84. Namely, the coordinates of fixation points of the occupant P corresponding to the five locations of the markers 84 in the test image 81, and the coordinates of a fixation point corresponding the single location of the marker 84 in the authentication image 82, can be stored in the display position information 120.

During execution of the assembly processing and the adjustment processing, information regarding misalignment between the positions of the respective markers 84 on the projection surface 16 and the positions of design-reference points 92 of the respective markers 84 (see FIG. 6 and FIG. 7) is stored in the misalignment information 130. Note that the design-reference points 92 and the coordinates of the markers 84 align with each other in cases in which the display device 10 has been assembled true to design. As previously described, the positions of the respective markers 84 on the projection surface 16 are stored in the display position information 120 as the coordinates of the fixation points of the occupant P. Thus, deviation of the coordinates of the fixation points corresponding to the respective markers 84 from the coordinates of the corresponding design-reference points 92, in other words the relative coordinates of the fixation points of the markers 84 with respect to the design-reference points 92, are stored in the misalignment information 130.

Image correction amounts for the positions of the respective markers 84 are stored in the correction information 140. Specifically, the image to be output by the output section 200, described later, is reshaped such that relative positions of the respective markers 84 with respect to the design-reference points 92, which are stored as the misalignment information 130, become 0.

FIG. 5 is a block diagram illustrating an example of functional configuration of the display control device 20. As illustrated in FIG. 5, the display control device 20 includes the output section 200, the acquisition section 210, the detection section 220, the correction section 230, and the notification section 240.

The output section 200 has a function of outputting various images, including the target images 80, to the projector 24. The projector 24 projects the images output from the output section 200 onto the projection surface 16, this being an interior surface 14A of the vehicle 12.

The output section 200 of the present exemplary embodiment outputs the test image 81 to the projector 24 during the assembly processing. The output section 200 also outputs the authentication image 82 to the projector 24 during the adjustment processing.

The acquisition section 210 has a function of acquiring vision information of the occupant P of the vehicle 12. The vision information of the present exemplary embodiment is position information regarding the fixation points when the occupant P fixates on the respective markers 84 on the projection surface 16. The vision information is generated by the eye tracking system 30 based on captured images captured by the onboard camera 32, and the acquisition section 210 acquires the vision information from the eye tracking system 30.

The detection section 220 has a function of detecting misalignment between the target image 80 as projected onto the projection surface 16 and a design-reference state, based on the vision information acquired by the acquisition section 210. In the present exemplary embodiment, the detection section 220 detects misalignment between the target image 80 as projected onto the projection surface 16 and the design-reference state while the occupant P fixates on the target image 80 projected onto the projection surface 16. The design-reference state refers to a display state of the target image 80 when projection of the target image 80 onto the projection surface 16 is true to design.

During the assembly processing, described later, the detection section 220 detects misalignment by comparing the coordinates of the design-reference points 92 of the respective markers 84 in the test image 81 against the coordinates of the fixation points of the eyes E of the occupant P corresponding to the respective markers 84 when the test image 81 is being projected onto the projection surface 16 by the projector 24. During the adjustment processing, described later, the detection section 220 also detects misalignment while the occupant P fixates on the central marker 84 acting as a target in the authentication image 82 and the authentication system 40 performs iris authentication based on the acquired iris scan of the eye E. Specifically, misalignment is detected by comparing the coordinates of the design-reference point 92 of the marker 84 in the authentication image 82 against the coordinates of the fixation point of the eyes E of the occupant P corresponding to the marker 84.

The correction section 230 has a function of correcting images to be projected by the projector 24 based on misalignment information detected by the detection section 220. Specifically, the correction section 230 reshapes the images to be projected by the projector 24 so as to eliminate the misalignment detected by the detection section 220. This reshaping includes changes to tilt and scale, translational movement, and so on.

Note that during the adjustment processing, described later, the correction section 230 only performs correction in cases in which the detected misalignment is within a permissible range within which correction is permitted. As illustrated in FIG. 7 as an example, this permissible range is expressed by a vertical and horizontal frame 94 centered on the central design-reference point 92, with correction being possible when the projected marker 84 falls within this frame 94.

The notification section 240 has a function of performing a prescribed notification in cases in which the misalignment detected by the detection section 220 exceeds the permissible range (the frame 94 in FIG. 7). In cases in which the misalignment exceeds the permissible range, the notification section 240 of the present exemplary embodiment outputs a support request notification to the central server 60. On receiving this notification, the central server 60 ascertains that misalignment that cannot be adjusted by the functionality of the display control device 20 has occurred in the display device 10 of the vehicle 12. The central server 60 can then for example transmit installation information for correcting the misalignment and change the settings of the projector 24 in order to eliminate the misalignment of the display device 10. The central server 60 may also transmit information to prompt repair of the vehicle 12 at a dealership.

Control Flow

Next, explanation follows regarding examples of processing executed by the display control device 20 of the present exemplary embodiment, with reference to flowcharts.

Figure 9:
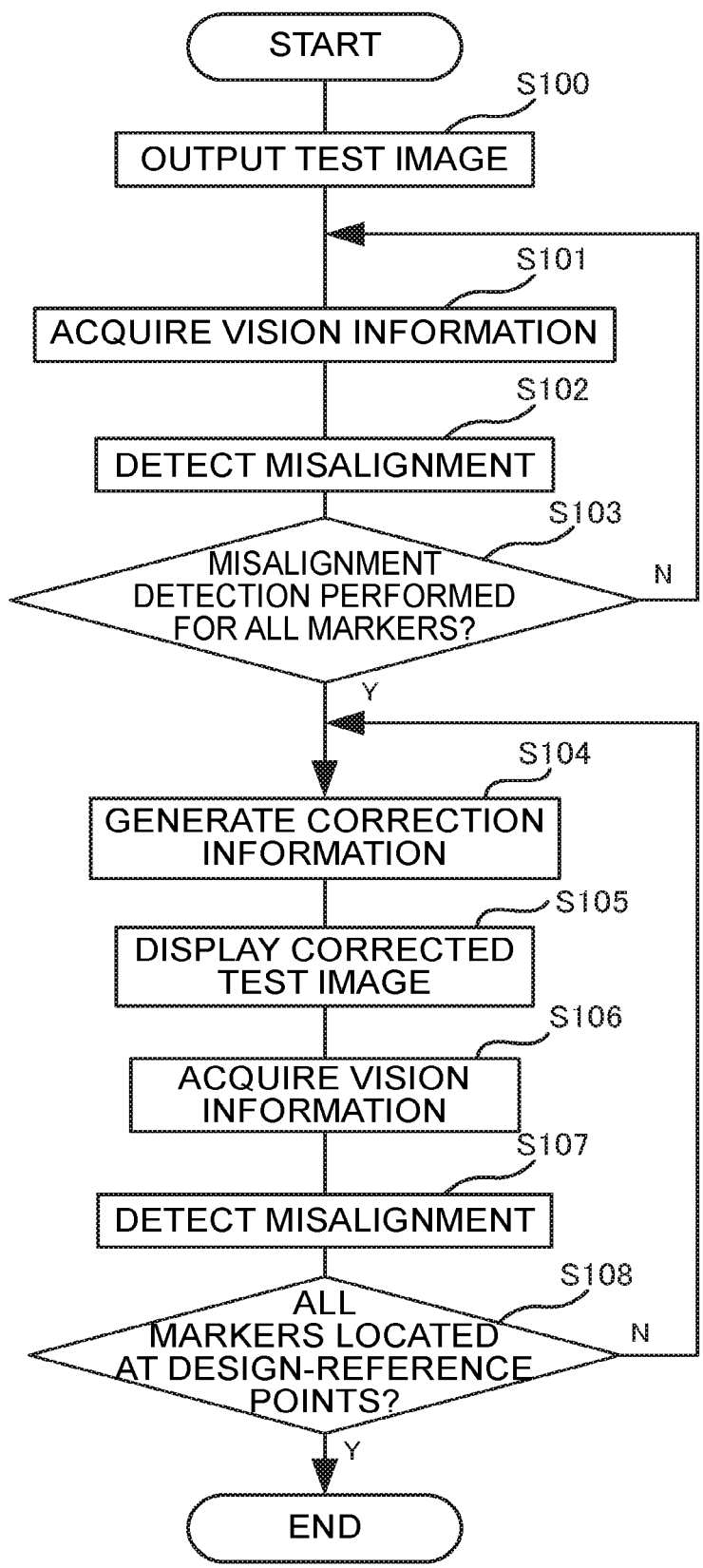
FIG. 9 is a flowchart illustrating a flow of assembly processing executed by the display control device of the first exemplary embodiment.

First, explanation follows regarding a flow of the assembly processing executed when for example the dashboard 14 and the projector 24 are assembled during assembly of the display device 10 to the vehicle 12, with reference to FIG. 9. Note that the assembly processing is executed by a technician onboard the vehicle 12 fixating on the markers 84. Namely, the technician onboard the vehicle 12 corresponds to the occupant P during the assembly processing.

At step S100 in FIG. 9, the CPU 20A outputs the test image 81 stored in the image information 110 to the projector 24. The test image 81 is thereby displayed on the projection surface 16 as illustrated in FIG. 6.

At step S101, the CPU 20A acquires the vision information. Namely, the CPU 20A acquires the coordinates of the markers 84 that the occupant P fixates on from the eye tracking system 30 as the vision information. Note that there are five markers 84 in the test image 81 of the present exemplary embodiment. The position of the marker 84 that the occupant P is fixating on is thereby identified by indicating this marker 84 using the touch panel 26.

At step S102, the CPU 20A detects misalignment between a given design-reference point 92 and the marker 84 corresponding to this design-reference point 92.

At step S103, the CPU 20A determines whether or not misalignment detection has been performed for all of the markers 84. In cases in which the CPU 20A determines that misalignment detection has been performed for all of the markers 84, processing proceeds to step S104. In cases in which the CPU 20A determines that misalignment detection has not been performed for all of the markers 84, processing returns to step S101.

At step S104, the CPU 20A generates correction information based on the misalignment amounts of the respective markers 84. For example, consider a case in which the upper-left marker 84 is misaligned by 2 mm to the right and 3 mm downward with respect to the corresponding design-reference point 92, and the upper-right marker 84 is misaligned by 1 mm to the left and 2 mm downward with respect to the corresponding design-reference point 92. In such a case, correction information is generated in order to shift the upper-left marker 84 2 mm to the left and 3 mm upward, and to shift the upper-right marker 84 1 mm to the right and 2 mm upward by enlarging, rotating, and moving the image stored in the image information 110.

At step S105, the CPU 20A outputs a corrected test image 81 to the projector 24. Specifically, the CPU 20A applies the correction information to the test image 81 stored in the image information 110, and then outputs the corrected test image 81. The corrected test image 81 is thereby displayed on the projection surface 16.

At step S106, the CPU 20A acquires the vision information. Namely, the CPU 20A acquires the coordinates of the marker 84 that the occupant P fixated on from the eye tracking system 30 as the vision information.

At step S107, the CPU 20A detects misalignment between a given design-reference point 92 and the marker 84 corresponding to this design-reference point 92.

At step S108, the CPU 20A determines whether or not all of the markers 84 are located at the design-reference points 92. In cases in which all of the markers 84 are located at the corresponding design-reference points 92, namely, in cases in which none of the markers 84 are misaligned, the CPU 20A ends the assembly processing. In cases in which the markers 84 are not all located at the corresponding design-reference points 92, namely in cases in which any of the markers 84 is misaligned, the CPU 20A returns to step S104. The assembly processing is thereby executed until misalignment has been eliminated for all the markers 84.

By executing the assembly processing, images to be projected onto the projection surface 16 are corrected based on the correction information and displayed at the location for which they were designed.

Figure 10:
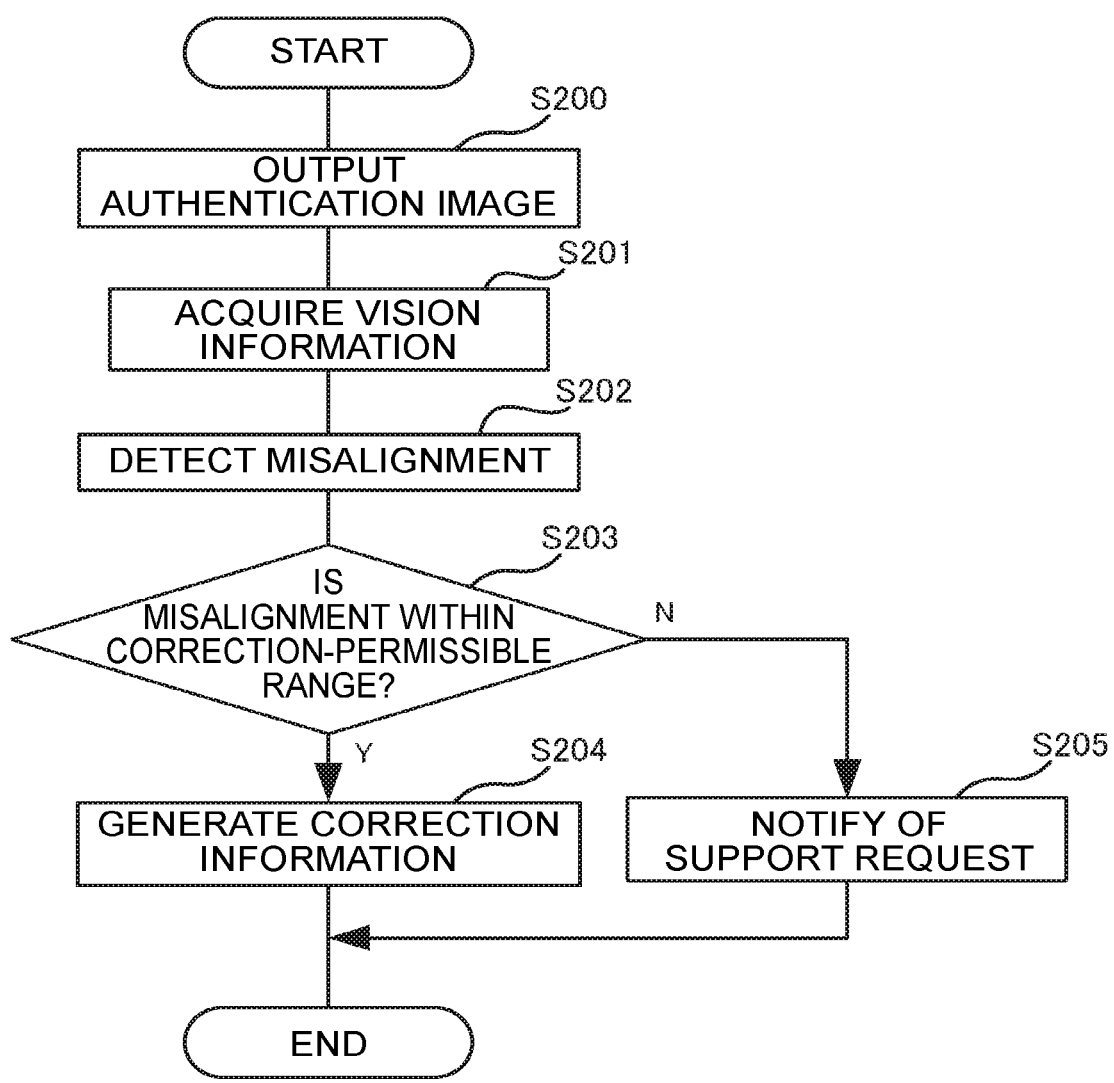
FIG. 10 is a flowchart illustrating a flow of adjustment processing executed by the display control device of the first exemplary embodiment.

Next, explanation follows regarding a flow of adjustment processing executed in the course of use of the display device 10 in the vehicle 12, with reference to FIG. 10. The adjustment processing is executed while the authentication system 40 is executing iris authentication.

At step S200 in FIG. 10, the CPU 20A outputs the authentication image 82 stored in the image information 110 to the projector 24. The authentication image 82 is thereby displayed on the projection surface 16 as illustrated in FIG. 7. The occupant P fixates on the central marker 84 in the authentication image 82, and the authentication system 40 thereby acquires the iris scan of the eye E of the occupant P imaged by the onboard camera 32 in order to execute iris authentication.

At step S201, the CPU 20A acquires the vision information. Namely, the CPU 20A acquires the coordinates of the marker 84 that the occupant P fixated on from the eye tracking system 30 or the authentication system 40 as the vision information.

At step S202, the CPU 20A detects misalignment between the marker 84 and the design-reference point 92.

At step S203, the CPU 20A executes determination as to whether or not the misalignment of the marker 84 is within a correction-permissible range. In cases in which the CPU 20A determines that the misalignment of the marker 84 is within the correction-permissible range, processing proceeds to step S204. In cases in which the CPU 20A determines that the misalignment of the marker 84 is not within the correction-permissible range, namely that the misalignment exceeds the correction-permissible range, processing proceeds to step S205.

At step S204, the CPU 20A generates correction information based on the misalignment amount of the marker 84. For example, consider a case in which the central marker 84 is misaligned by 3 mm to the right and 1 mm upward with respect to the design-reference point 92. In such a case, correction information is generated in order to shift the central marker 84 3 mm to the left and 1 mm downward by translational movement of the image stored in the image information 110. The adjustment processing is then ended.

At step S205, the CPU 20A notifies the central server 60 of a support request. The adjustment processing is then ended.

When correction information is generated as a result of the adjustment processing, images to be projected onto the projection surface 16 are corrected based on the correction information and displayed at the location for which they were designed.

Summary of First Exemplary Embodiment

The display control device 20 of the present exemplary embodiment is applied to a vehicle equipped with the projector 24 that projects images onto the projection surface 16 of the dashboard 14. The display control device 20 is formed such that the output section 200 outputs images to the projector 24, and the acquisition section 210 is capable of acquiring vision information of the occupant P. When the occupant P fixates on a target image 80 projected onto the projection surface 16, the detection section 220 detects misalignment between the target image 80 projected onto the projection surface 16 and the design-reference state based on the acquired vision information. The correction section 230 then corrects the image projected by the projector 24 based on the detected misalignment. In the display control device 20 of the present exemplary embodiment, distortion of images projected onto the projection surface 16 is corrected by the occupant P fixating on the target image 80, thus reducing the time required for correction.

The vision information of the present exemplary embodiment is position information relating to fixation points of the occupant P corresponding to the markers 84 on the projection surface 16, and the detection section 220 detects misalignment by comparing design-reference positions of the markers 84 against the positions of the fixation points corresponding to the markers 84. The display control device 20 of the present exemplary embodiment enables the positions of the markers 84 in a projected target image 80 to be ascertained by acquiring the fixation points of the occupant P, and thereby enables misalignment with respect to the design-reference positions to be detected.

In the present exemplary embodiment, during the assembly processing the test image 81 including the plural markers 84 is projected onto the projection surface 16 when assembling the display device 10 to the vehicle 12. The present exemplary embodiment therefore enables misalignment of the display on the projection surface 16 to be precisely detected by having the occupant P fixate on the plural points on the test image 81 during the assembly processing.

In particular, in the present exemplary embodiment, in the test image 81 at least one of the markers 84 is provided at the inside, and four of the markers 84 are provided at the outer periphery, thereby enabling tilting of images projected onto the projection surface 16 and distortion of the interior surface to be detected.

In the present exemplary embodiment, during the adjustment processing the authentication image 82 including the single central marker 84 is projected onto the projection surface 16 when the vehicle 12 is utilized by the occupant P. In the present exemplary embodiment, providing the single marker 84 in the authentication image 82 during the adjustment processing enables misalignment of the image display position due to translational movement to be detected while suppressing inconvenience to the occupant P who is being made to fixate on the image in order to correct the image. The display control device 20 of the present exemplary embodiment is also capable of notifying the central server 60 that is external to the vehicle 12 in cases in which the display position is greatly misaligned.

In particular, in the present exemplary embodiment, the adjustment processing is executed while iris authentication is being performed by the authentication system 40. Namely, the present exemplary embodiment enables image correction to be performed while iris authentication is being performed.

In the present exemplary embodiment, the correction section 230 reshapes an image projected by the projector 24 based on the misalignment detected by the detection section 220. Thus, the display control device 20 of the present exemplary embodiment enables display correction to be performed without any additional hardware configuration.

Modified Example of First Exemplary Embodiment

The test image 81 that is projected onto the projection surface 16 when assembly processing is performed includes five of the markers 84. The technician acting as the occupant P therefore needs to identify the position of the marker 84 that they are fixating on by indicating this marker 84 using the touch panel 26. By contrast, in a modified example of the first exemplary embodiment, the output section 200 outputs a test image 81 in which the plural markers 84 are sequentially displayed on the projection surface 16.

In cases in which the plural markers 84 are simultaneously displayed on the projection surface 16, there is a need to distinguish which marker 84 out of the plural markers 84 the occupant P is fixating on. In contrast thereto, in the present modified example, the markers 84 are sequentially displayed on the projection surface 16 one at a time, thereby enabling distinguishing of the marker 84 that is being fixated on to be simplified.

Second Exemplary Embodiment

A display control device 20 of a second exemplary embodiment is configured to enable image correction based on the position of the eyes E of the occupant P. Explanation follows regarding points that differ from those in the first exemplary embodiment. Note that configuration that is the same as that in the first exemplary embodiment is allocated the same reference numerals, and detailed explanation thereof is omitted.

Figure 11:
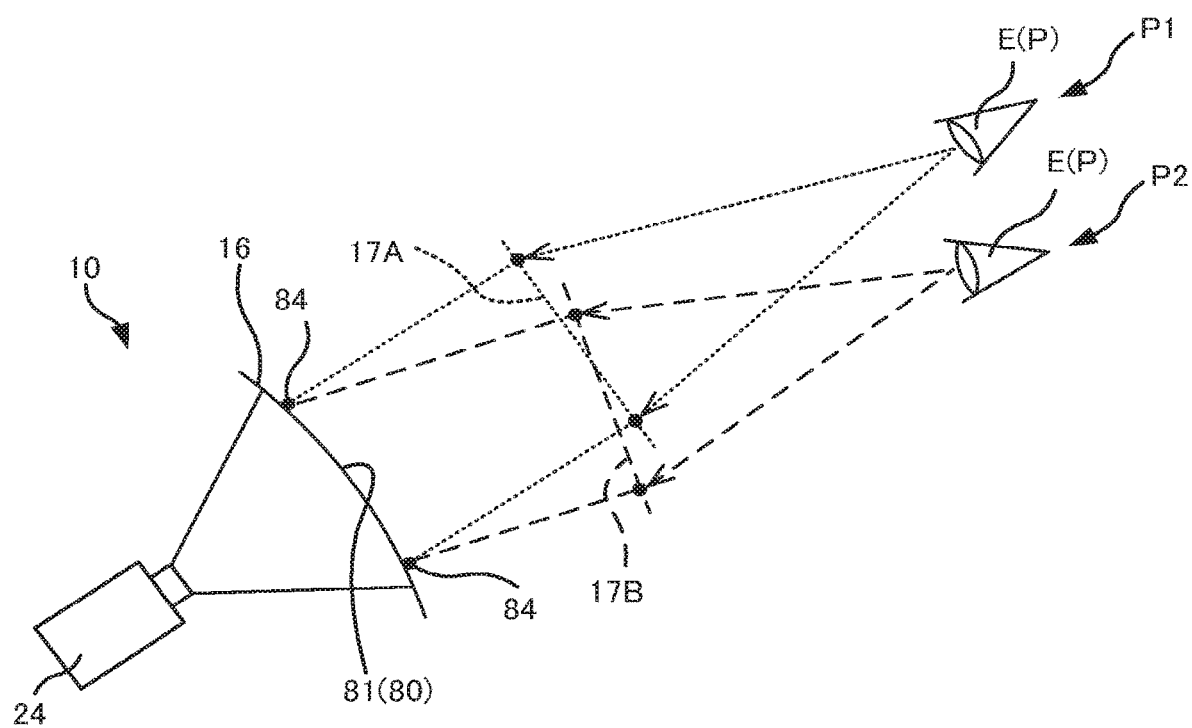
FIG. 11 is a diagram illustrating positional relationships between a display device of a second exemplary embodiment and the eyes of an occupant.

In the display control device 20 of the present exemplary embodiment, the apparent shape of a target image 80 being displayed to the occupant P is identified based on viewpoint information for an observation point corresponding to the position of the eyes E of the occupant P, and on the profile of the projection surface 16. Specifically, the acquisition section 210 acquires the observation point of the occupant P, and the detection section 220 identifies the shape of the target image 80 projected onto the projection surface 16 as viewed from the acquired position of the eyes E. For example, in a case in which the eyes E of the occupant P are at a position P1 as illustrated in FIG. 11, the detection section 220 identifies a display shape 17A as the apparent shape of the target image 80 based on the respective markers 84 in the target image 80.

In the present exemplary embodiment, a design-reference shape of the target image 80 is stored in the image information 110. For example, a design-reference shape 17B corresponding to the shape of the target image 80 from the perspective of the eyes E of the occupant P when at a position P2 is stored in the image information 110.

The detection section 220 compares the display shape 17A against the design-reference shape 17B of the target image 80. Thus, even in cases in which the eyes E are at the position P1, the correction section 230 is able to show the occupant P the target image 80 based on the pre-designed design-reference shape 17B. The present exemplary embodiment thereby enables misalignment arising due to differences in display region and angle according to the position of the eyes E of the occupant P to be detected.

Remarks

Although the target images 80 that include the markers 84 as feature points are utilized in the assembly processing and the adjustment processing of the above exemplary embodiments, there is no limitation thereto. For example, it is sufficient that a target image 80 be an image enabling the occupant P to fixate on a particular location, for example in an image applied with crosshair pattern configured from a combination of vertical and horizontal lines.

In the display control device 20 of the above exemplary embodiments, the vision information relating to the fixation points or the observation point of the occupant P is acquired from the eye tracking system 30. However, there is no limitation thereto, and the display control device 20 may generate the vision information based on captured images directly acquired from the onboard camera 32.

Note that the various processing executed by the CPU 20A reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiments, the program is in a format pre-stored (installed) in a computer-readable non-transitory recording medium. For example, the control program 100 of the display control device 20 is pre-stored in the storage 20D. However, there is no limitation thereto, and a program may be provided in a format recorded on a non-transitory recording medium such as compact disc read only memory (CD-ROM), digital versatile disc read only memory (DVD-ROM), or universal serial bus (USB) memory. Alternatively, a program may be provided in a format downloadable from an external device through a network.

The flows of processing explained in the above exemplary embodiments are merely examples, and superfluous steps may be omitted, new steps may be added, or the processing sequence may be changed within a range not departing from the spirit of the present disclosure.

What is claimed is:

1. A display control device, comprising:
processing circuitry configured to
output an image to a projector configured to project an image onto an interior surface of a vehicle;
acquire vision information of an occupant of the vehicle;
detect misalignment between a target image projected onto the interior surface and a design-reference state of the target image based on the vision information, which is acquired while the occupant fixates on the target image projected onto the interior surface, wherein the target image includes at least one feature point, the vision information is position information of a fixation point when the occupant fixates on one particular feature point on the interior surface, and the processing circuitry is further configured to detect the misalignment by comparing a design-reference position of the one particular feature point against a position of the one fixation point corresponding to the one particular feature point; and
correct an image projected by the projector based on the detected misalignment,
wherein a single one of the at least one feature point is included in the target image when the vehicle is being utilized by the occupant; and
the processing circuitry is further configured to
perform correction when the detected misalignment is within a permissible range within which correction is permitted, and
perform a prescribed notification when the detected misalignment exceeds the permissible range within which the correction is permitted.

2. The display control device of claim 1, wherein the processing circuitry is further configured to output the target image to the projector when the projector is being assembled in the vehicle, the target image including a plurality of feature points to be displayed at a plurality of different positions on the interior surface.

3. The display control device of claim 2, wherein the projector is further configured to output the target image such that the plurality of feature points are sequentially displayed on the interior surface.

4. The display control device of claim 2, wherein the target image output by the projector includes at least one of the feature points displayed inside a prescribed region of the interior surface, and
feature points are displayed at least at four locations at an outer edge of the prescribed region.

5. The display control device of claim 1, wherein, when setting information to make the correction is received from a server that has received the prescribed notification, the processing circuitry is further configured to attempt to apply a setting based on the setting information.

6. The display control device of claim 1, wherein the processing circuitry is further configured to receive, from a server that has received the prescribed notification, information prompting the occupant to instigate a repair.

7. The display control device of claim 1, wherein the processing circuitry is further configured to:
as the feature point, output, to the projector, a target employed to acquire iris information of the occupant by authentication circuitry configured to perform iris authentication; and while the iris authentication is being performed, detect the misalignment based on the iris information acquired by the authentication circuitry when the occupant fixates on the target.

8. The display control device of claim 1, wherein:
the vision information is viewpoint information regarding an observation point of an eye of the occupant; and
the processing circuitry is further configured to detect the misalignment by comparing a design-reference shape of the target image against an apparent shape of the target image based on the viewpoint information and a profile of the interior surface.

9. The display control device of claim 1, wherein the processor processing circuitry is further configured to:
perform correction to reshape an image projected by the projector so as to eliminate the detected misalignment; and
output the corrected image to the projector.

10. The display control device of claim 1, wherein the processing circuitry is further configured to notify a server when the detected misalignment exceeds the permissible range, such that correction is not permitted.

11. An image correction method, comprising:
outputting an image to a projector configured to project an image onto an interior surface of a vehicle;
acquiring vision information of an occupant of the vehicle;
detecting misalignment between a target image projected onto the interior surface and a design-reference state of the target image based on the vision information, which is acquired while the occupant fixates on the target image projected onto the interior surface, wherein the target image includes at least one feature point, the vision information is position information of a fixation point when the occupant fixates on one particular feature point on the interior surface, and the detecting step further comprises detecting the misalignment by comparing a design-reference position of the one particular feature point against a position of the one fixation point corresponding to the one particular feature point; and
correcting a projected image based on the detected misalignment,
wherein a single one of the at least one feature point is included in the target image when the vehicle is being utilized by the occupant; and
the method further includes
performing correction when the detected misalignment is within a permissible range within which correction is permitted, and
performing a prescribed notification when the detected misalignment exceeds the permissible range within which the correction is permitted.

12. A non-transitory computer-readable recording medium recorded with a program that when executed by a computer, causes the computer to perform a method, the method comprising:
outputting an image to a projector configured to project an image onto an interior surface of a vehicle;
acquiring vision information of an occupant of the vehicle;
detecting misalignment between a target image projected onto the interior surface and a design-reference state of the target image based on the vision information, which is acquired while the occupant fixates on the target image projected onto the interior surface, wherein the target image includes at least one feature point, the vision information is position information of a fixation point when the occupant fixates on one particular feature point on the interior surface, and the detecting step further comprises detecting the misalignment by comparing a design-reference position of the one particular feature point against a position of the one fixation point corresponding to the one particular feature point; and
correcting a projected image based on the detected misalignment,
wherein a single one of the at least one feature point is included in the target image when the vehicle is being utilized by the occupant; and
the method further includes
performing correction when the detected misalignment is within a permissible range within which correction is permitted, and
performing a prescribed notification when the detected misalignment exceeds the permissible range within which the correction is permitted.

* * * * *